United States Patent
Narayanan et al.

(10) Patent No.: US 9,457,731 B2
(45) Date of Patent: Oct. 4, 2016

(54) INTEGRATED DEVICE HOLDER ASSEMBLY AND METHODS OF USE AND MANUFACTURE THEREOF

(71) Applicant: Honda Motor Co., Ltd., Tokyo (JP)

(72) Inventors: Ganesh Narayanan, Dublin, OH (US); Spyridon G. Blatseas, Dublin, OH (US); Derek Shane Lindsay, Marysville, OH (US); Ross L. Burghardt, Marysville, OH (US); Fernando Montijo, Aliso Viejo, CA (US); Brian T. Pagano, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 396 days.

(21) Appl. No.: 14/287,905

(22) Filed: May 27, 2014

(65) Prior Publication Data
US 2015/0343957 A1    Dec. 3, 2015

(51) Int. Cl.
*B60R 7/00* (2006.01)
*B60R 11/02* (2006.01)
*B60R 7/04* (2006.01)
*B60R 7/14* (2006.01)
*B60N 3/10* (2006.01)
*B60R 11/00* (2006.01)

(52) U.S. Cl.
CPC ............... *B60R 11/02* (2013.01); *B60N 3/103* (2013.01); *B60R 7/043* (2013.01); *B60R 7/14* (2013.01); *B60R 2011/0015* (2013.01); *B60R 2011/0017* (2013.01); *B60R 2011/0071* (2013.01); *Y10T 29/49828* (2015.01)

(58) Field of Classification Search
CPC ............................... B60R 7/043; B60N 3/103
USPC ........................................................ 224/275
See application file for complete search history.

(56) References Cited

U.S. PATENT DOCUMENTS

| | | | |
|---|---|---|---|
| 5,713,627 A * | 2/1998 | De Filippo | B60R 7/12 135/16 |
| 6,092,705 A | 7/2000 | Meritt | |
| 6,216,927 B1 * | 4/2001 | Meritt | B60R 11/02 224/275 |
| 6,445,408 B1 | 9/2002 | Watkins | |
| 6,450,571 B1 * | 9/2002 | Canni | B60N 2/643 297/188.04 |
| 7,048,163 B2 | 5/2006 | Albert et al. | |

(Continued)

FOREIGN PATENT DOCUMENTS

| AU | 49245/97 A | 6/1998 |
|---|---|---|
| CA | 2628840 C | 3/2013 |

*Primary Examiner* — Justin Larson
*Assistant Examiner* — Lester L Vanterpool
(74) *Attorney, Agent, or Firm* — Kenealy Vaidya LLP

(57) ABSTRACT

Some embodiments are directed to a holder assembly that includes a lower covering portion that covers and thereby retains a lowermost portion of a mobile electronic device, the lower covering portion being integrated with a rear of a vehicle seat. The holder assembly also includes an upper support portion that supports a top portion of the mobile electronic device, the upper support portion being integrated with the rear of the vehicle seat. The upper support portion and lower covering portion are configured to cooperatively: 1) hold the mobile electronic device in the orientation to enable a passenger in a rear compartment of the vehicle to view the screen of the mobile electronic device upon the mobile electronic device being manually engaged with the holder assembly, and 2) enable the manual disengagement of the mobile electronic device from the holder assembly.

20 Claims, 9 Drawing Sheets

(56) References Cited

U.S. PATENT DOCUMENTS

| | | | |
|---|---|---|---|
| 7,207,469 B2 | 4/2007 | Hussaini et al. | |
| 7,665,804 B1 * | 2/2010 | Jeffrey | A47C 7/386 297/219.1 |
| 8,020,936 B2 * | 9/2011 | Asami | A47C 7/40 297/188.04 |
| 8,210,605 B2 | 7/2012 | Hough et al. | |
| 8,561,863 B2 | 10/2013 | LaColla et al. | |
| 9,315,157 B2 * | 4/2016 | Jahn | B60R 7/043 |
| 2003/0155796 A1 * | 8/2003 | DePaulis | B60N 2/60 297/229 |
| 2005/0011920 A1 * | 1/2005 | Feng | B60R 7/043 224/275 |
| 2005/0161480 A1 * | 7/2005 | Tirey | B60R 7/043 224/275 |
| 2006/0022003 A1 * | 2/2006 | Zheng | B60R 11/0235 224/275 |
| 2007/0045365 A1 * | 3/2007 | Guo | B60R 11/0252 224/275 |
| 2007/0222248 A1 * | 9/2007 | Maulden | B60N 2/4876 296/37.15 |
| 2009/0065540 A1 | 3/2009 | Pantoja | |
| 2011/0278885 A1 * | 11/2011 | Procter | B60R 11/0235 297/135 |
| 2012/0018471 A1 | 1/2012 | Guillermo et al. | |
| 2012/0097831 A1 | 4/2012 | Olukotun et al. | |
| 2012/0312847 A1 * | 12/2012 | LaColla | B60R 11/02 224/275 |
| 2013/0200119 A1 * | 8/2013 | Ackeret | B60R 11/0235 224/275 |

* cited by examiner

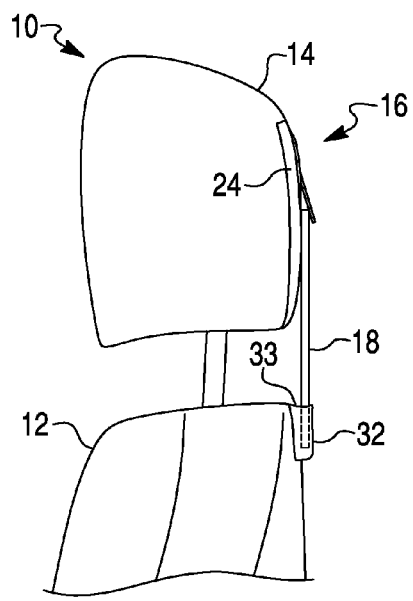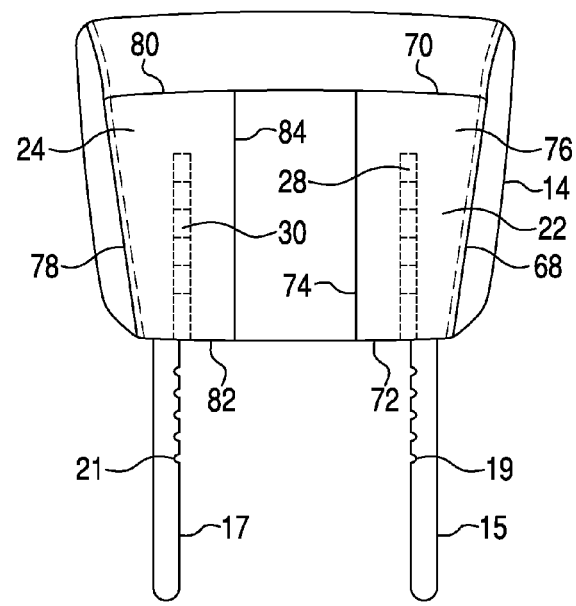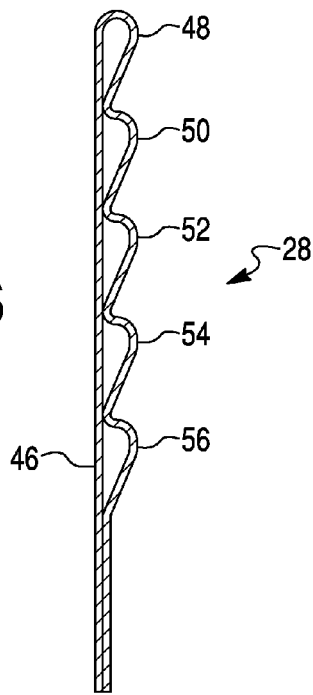

INTEGRATED DEVICE HOLDER ASSEMBLY AND METHODS OF USE AND MANUFACTURE THEREOF

BACKGROUND

The disclosed subject matter relates to methods and apparatus for holding certain types of devices, including but not limited to mobile electronic devices. More particularly, the disclosed subject matter relates to a device holder assembly, and methods of use and manufacture thereof, which is integrated into a seat, such as at the rear of a vehicular seat.

It has become increasingly popular to access electronic devices in vehicles, such as by passengers traveling in backseat compartments of the vehicles. In fact, some related art vehicles, including cars, SUVs, minivans, etc., include a permanently installed electronic device, such as a DVD player, with a screen disposed at a central area of the vehicle interior ceiling so as to be viewable by all passengers traveling in the backseat compartment.

SUMMARY

However, not all vehicles include such permanently installed electronic devices; and even in vehicles that include such devices, circumstances may make it beneficial for backseat occupants to access multiple devices, such as in the case of multiple passengers desiring to watch different movies, run separate applications, play different games, read different materials, combinations thereof, etc. It may also be desirable for backseat occupants to access or otherwise operate mobile electronic devices, such as those that may have functionalities that are different than permanently installed electronic devices. Thus, one or more backseat occupants may access or otherwise operate a mobile electronic device, which is typically accomplished by holding the device with the occupant's hands and/or balancing the device on the occupant's legs, lap, etc., which can be awkward, unwieldy, etc., especially in cases where the occupant is not merely viewing the device screen, such as where the occupant is entering information, changing settings, etc.

It may therefore be beneficial to provide methods and apparatus for relieving backseat occupants of the requirement of holding mobile electronic devices to allow them to more easily access or otherwise operate such devices. An especially beneficial location for holding the mobile electronic devices is at or adjacent the rear of a front vehicle seat, thereby enabling the backseat occupant to easily view the associated screen. However, related art seats do not include apparatus for holding mobile electronic devices to facilitate access or use by backseat occupants. Instead, related art vehicle seats typically only include a seat bottom, back, and head rest, wherein the head rests are adjustable relative to the seat back to accommodate occupants of different sizes, and the rear surface of the vehicle seat back includes a flap that provides storage at approximately a vertical midpoint. Thus, the primary way to hold a mobile electronic device at a related art vehicle seat is through use of a holding apparatus that is completely separate from both the seat and the mobile electronic device, which is cumbersome, requires more work and/or expense from the vehicle occupant/owner, etc.

Some embodiments are therefore directed to a holder assembly, which is integrated with a rear of a vehicle seat, for holding a mobile electronic device in an orientation to enable a passenger in a rear compartment of the vehicle to view a screen of the mobile electronic device. The holder assembly can include a lower covering portion that covers and thereby retains a lowermost portion of the mobile electronic device, the lower covering portion being integrated with the rear of the vehicle seat. The holder assembly can also include an upper support portion that supports a top portion of the mobile electronic device, the upper support portion being integrated with the rear of the vehicle seat. The upper support portion and lower covering portion can be configured to cooperatively: 1) hold the mobile electronic device in the orientation to enable the passenger in the rear compartment of the vehicle to view the screen of the mobile electronic device upon the mobile electronic device being manually engaged with the holder assembly, and 2) enable the manual disengagement of the mobile electronic device from the holder assembly.

Some other embodiments are directed to a seat assembly for use with a vehicle and a mobile electronic device that is operable by a passenger in a rear compartment of the vehicle. The seat assembly can include a vehicle seat defining a rear, and a holder assembly, which is integrated with the rear of the vehicle seat, for holding the mobile electronic device in an orientation to enable the passenger in the rear compartment of the vehicle to view the screen of the mobile electronic device. The holder assembly can include a lower covering portion that covers and thereby retains a lowermost portion of the mobile electronic device, the lower covering portion being integrated with the rear of the vehicle seat. The holder assembly can also include an upper support portion that supports a top portion of the mobile electronic device, the upper support portion being integrated with the rear of the vehicle seat. The upper support portion and lower covering portion can be configured to cooperatively: 1) hold the mobile electronic device in the orientation to enable the passenger in the rear compartment of the vehicle to view the screen of the mobile electronic device upon the mobile electronic device being manually engaged with the holder assembly, and 2) enable the manual disengagement of the mobile electronic device from the holder assembly.

Still other embodiments are directed to a method of manufacturing a holder assembly, for holding a mobile electronic device in an orientation to enable a passenger in a rear compartment of the vehicle to view a screen of the mobile electronic device. The method can include integrating a lower covering portion with the rear of the vehicle seat, and configuring the lower covering portion to cover and thereby retain a lowermost portion of the mobile electronic device. The method can also include integrating an upper support portion with the rear of the vehicle seat, and configuring the upper support portion to support a top portion of the mobile electronic device. The method can further include configuring the upper support portion and lower covering portion to cooperatively: 1) hold the mobile electronic device in the orientation to enable the passenger in the rear compartment of the vehicle to view the screen of the mobile electronic device upon the mobile electronic device being manually engaged with the holder assembly, and 2) enable the manual disengagement of the mobile electronic device from the holder assembly.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is a partial side view of the vehicle seat, integrated device holder assembly, and first mobile electronic device of FIG. 1.

FIG. 5 is a plan view of a headrest of the vehicle seat and features of the integrated device holder assembly of FIG. 1.

FIG. 6 is a side view of an exemplary elastic strap of the integrated device holder assembly of FIG. 1.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

1. Seat and Mobile Electronic Device

Figure 1:
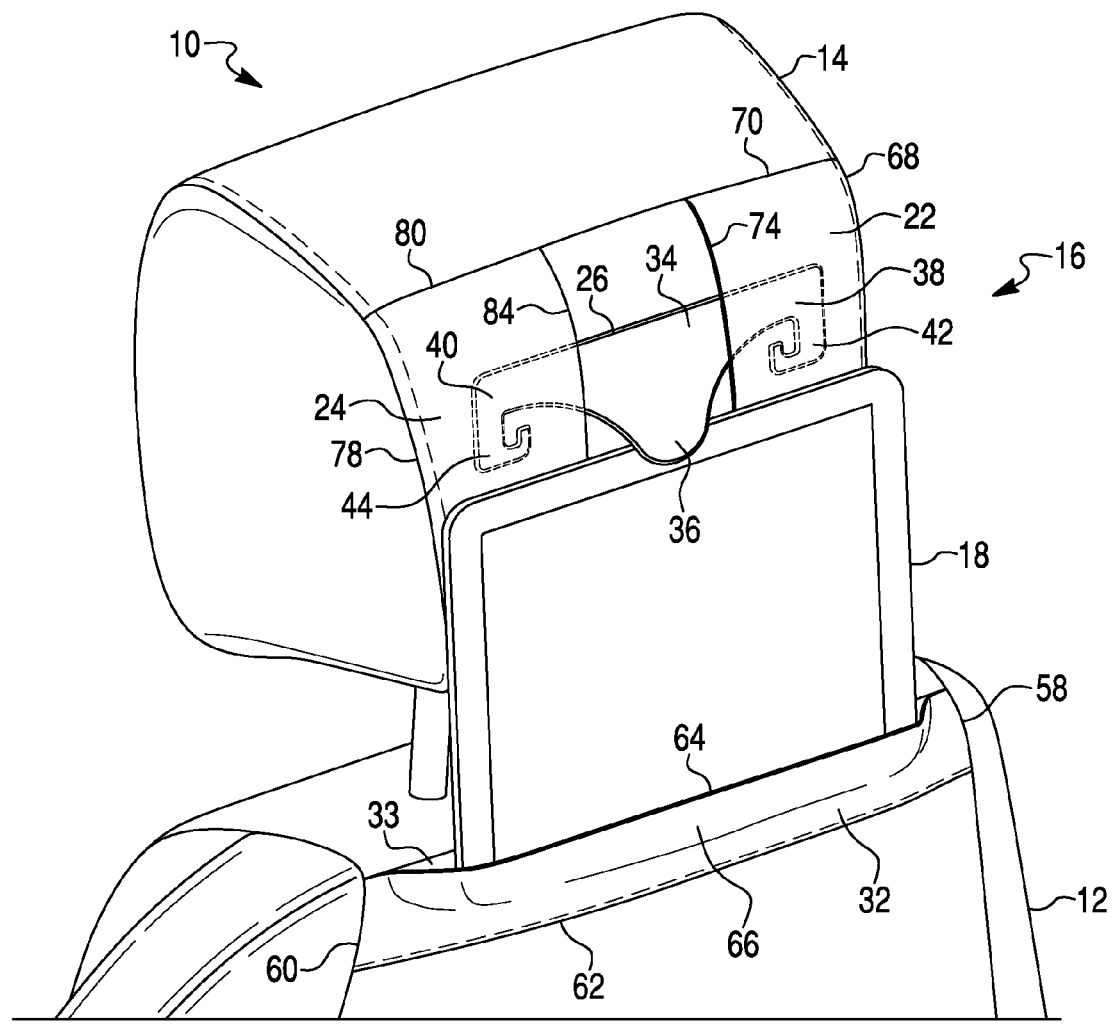
FIG. 1 is a partial rear perspective view of a vehicle seat and exemplary first embodiment of an integrated device holder assembly in accordance with the disclosed subject matter, with the assembly holding a first exemplary mobile electronic device in a first orientation.

FIG. 1 is a partial rear perspective view of a vehicle seat and exemplary first embodiment of an integrated device holder assembly in accordance with the disclosed subject matter, with the assembly holding a first exemplary mobile electronic device in a first orientation.

The seat 10 shown in FIG. 1 can be used in any vehicle, such as but not limited to a passenger car, truck, all-terrain vehicle (ATV), aircraft, personal watercraft, boat, train, amusement rides, semi-tractor and off-highway vehicle. However, embodiments are intended to include or otherwise cover any type of seat 10 that can be formed in rows, i.e., where a user of the mobile electronic device is disposed behind the seat 10, including seats not associated with vehicles, such as stadium or event seating.

The vehicle seat 10 can include a seat back 12, a head rest 14 and an integrated device holder assembly 16. The assembly 16 is disposed at the rear of the seat back 12 and can removably attach to or hold any one of a plurality of mobile electronic devices, such as but not limited to a smart phone, an electronic tablet, writing boards, a book, and any other device capable of receiving information, transmitting information and/or displaying information either through a hard-wired connection or a wireless connection or possibly without electrical connection. In fact, embodiments are intended to include or otherwise cover methods and apparatus for holding any type of known, related art or later developed mobile device. Hereinafter in the present disclosure, the mobile electronic devices that are attached to or held by the assembly 16 are referred to as the target mobile electronic device.

Figure 2:
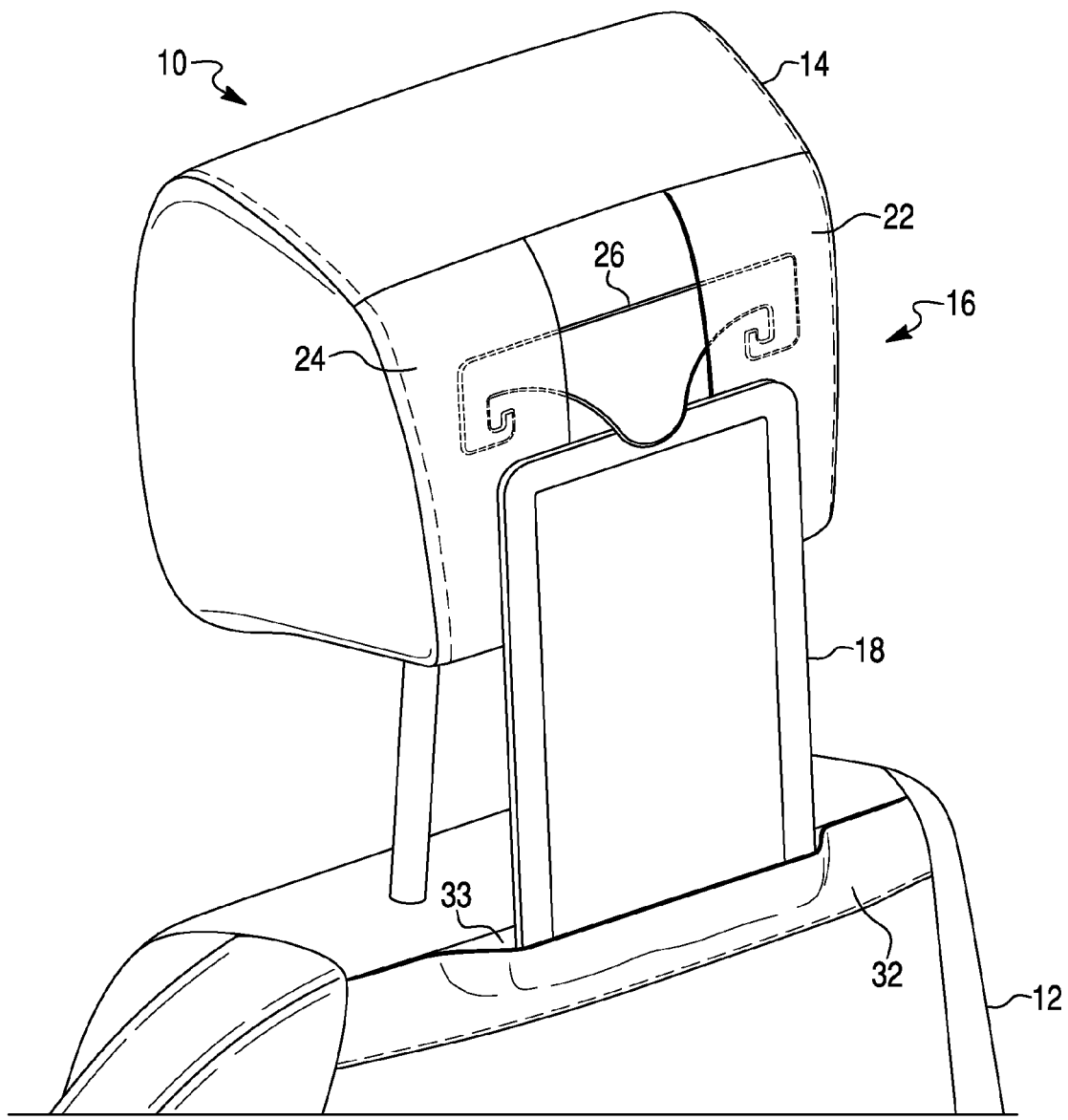
FIG. 2 is a partial rear perspective view of vehicle seat and the integrated device holder assembly of FIG. 1, with the assembly holding the first mobile electronic device in a second orientation.
Figure 3:
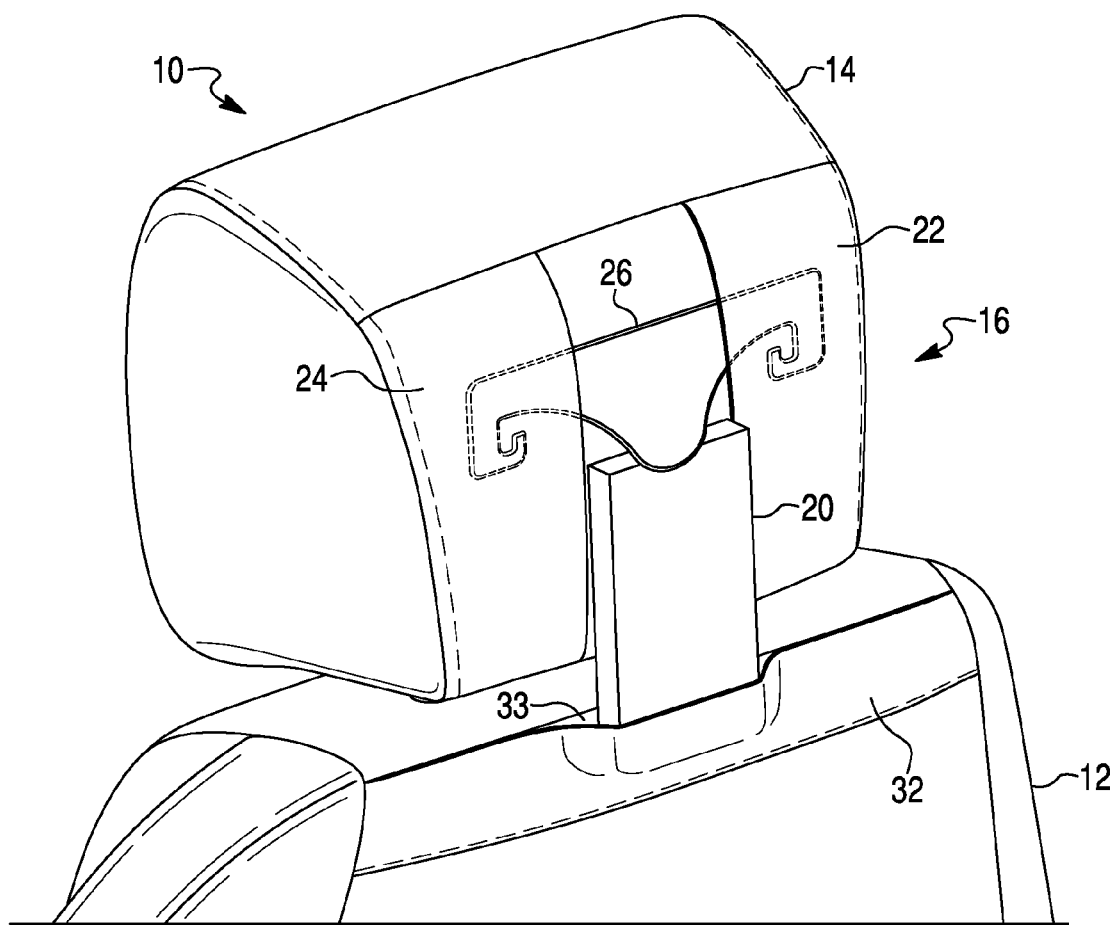
FIG. 3 is a partial rear perspective view of the vehicle seat and the integrated device holder assembly of FIG. 1, with the assembly holding a second exemplary mobile electronic device.
Figure 7:
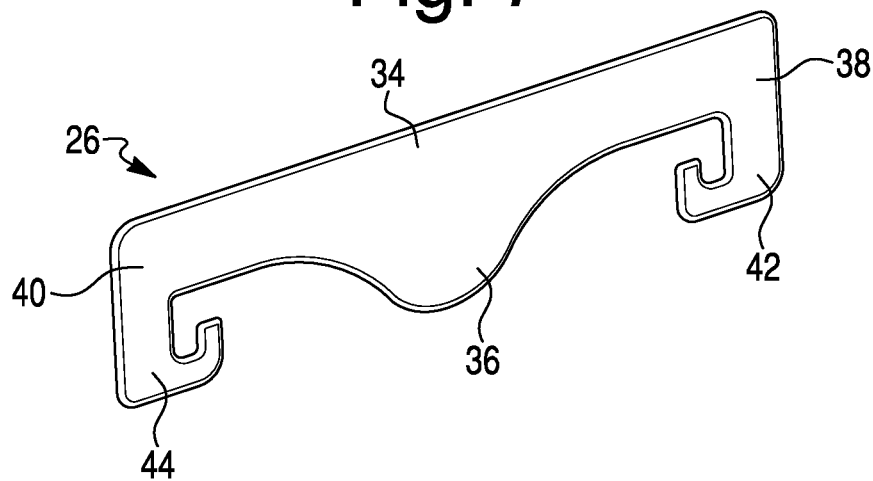
FIG. 7 is a perspective view of a first exemplary clamp member of the integrated device holder assembly of FIG. 1.

The integrated device holder assembly 16 can be configured to accommodate target mobile electronic devices of a plurality of sizes and shapes. FIG. 1 shows the integrated device holder assembly 16 attaching or holding a first target mobile electronic device 18 in a first orientation relative to the seat back 12 and the head rest 14. FIG. 2 shows the integrated device holder assembly 16 attaching or holding the first target mobile electronic device 18 of FIG. 1 in a second orientation relative to the seat back 12 and the head rest 14. FIG. 3 shows the integrated device holder assembly 16 attaching or holding a second target mobile electronic device 20 relative to the seat back 12 and the head rest 14. The second target mobile electronic device 20 can be different in size and/or shape as compared to the first mobile electronic device 18.

The exemplary embodiments of the integrated device holder assembly 16 shown in the figures are intended to cover or otherwise include mechanisms for attaching or holding target mobile electronic devices of any size and/or shape. For example, the second mobile electronic device 20 (FIG. 3) can be smaller in length and width, and can have a similar rectangular shape, as compared to the first mobile electronic device 18 (FIGS. 1-2). However, some embodiments attach or hold target mobile electronic devices of other shapes, including but not limited to circular, oblong, square, triangular, polygonal, irregular shapes, etc.

2. First Embodiment

As shown in FIGS. 1-7, the integrated device holder assembly 16 can include first and second trim panels 22, 24, a clamp member 26, first and second elastic members 28, 30 (FIG. 5), and a seat back trim panel 32. As discussed in further detail below, the clamp member 26 can cooperate with the first and second elastic members 28, 30 and the seat back trim panel 32 to permit the position of the clamp member 26 to be adjusted along the rear surface of the head rest 14 in order to accommodate different sizes and/or shapes of the plurality of mobile electronic devices. In other words, the clamp member 26 can cooperate with the first and second elastic members 28, 30 and the seat back trim panel 32 to permit the integrated device holder assembly 16 to attach or hold any of the plurality of mobile devices disclosed above at the rear of the vehicle seat 10.

The first and second elastic members 28, 30 shown in FIG. 5 can be configured to engage the clamp member 26 to bias the clamp member 26 toward the rear surface of the head rest 14, thereby holding the clamp member 26 in place. If the clamp member 26 is in contact with the mobile electronic device 18, then biasing the clamp member 26 toward the rear surface of the head rest 14 can also create a frictional force between the mobile electronic device 18 and the rear surface of the head rest 14, thereby helping to hold the mobile electronic device 18 in place. In addition, biasing the clamp member 26 toward the seat back trim panel 32 can urge the mobile electronic device 18 into a device pocket 33 formed by the seat back trim panel 32 and the rear area of the seat back 12, which more securely holds the mobile electronic device 18 in place.

The clamp member 26 can be configured with any shape and any dimensions that can permit the clamp member 26 to accommodate any mobile electronic device and to perform the operations disclosed above. In an exemplary embodiment, the clamp member 26 can include a central portion 34, a nose portion 36 extending from the central portion 34, a first arm portion 38 extending from the central portion 34, and a second arm portion 40 extending from the central portion 34. In an exemplary embodiment, the portions 34, 36, 38, 40 of the clamp member 26 can be unitarily formed as a single homogenous unit. In another exemplary embodiment, some or all of the portions 34, 36, 38, 40 of the clamp member 26 can be integrally formed or formed as separate components that are subsequently joined together to form the clamp member 26.

The nose portion 36 can be configured to engage the mobile electronic device if the target mobile electronic device is received by the integrated device holder assembly 16. The nose portion 36 can be configured to have any shape that performs this operation, such as a compound curved shape, which may be especially effective at contacting and holding the mobile electronic device 18. The nose portion 36 can include a top surface that faces away from the rear area of the head rest 14, and a bottom surface opposite to the top surface. The bottom surface of the nose portion 36 can face the rear area of the head rest 14. The bottom surface of the nose portion 36 can engage the mobile electronic device. However, as indicated above, the nose portion 36 can have any shape that enables it to maintain contact with the mobile electronic device 18.

The first arm portion 38 can be configured to selectively engage and disengage the first elastic member 28. The second arm portion 40 can be configured to selectively engage and disengage the second elastic member 30. The clamp member 26 can be formed to be generally symmetrical, such that the second arm portion 40 can extend in a direction that can be substantially parallel to the direction in which the first arm portion 38 extends. The second arm portion 40 can extend away from the central portion 34 in a direction substantially opposite to that in which the first arm portion 38 extends.

The first arm portion 38 can include a first hook portion 42, and the second arm portion 40 can include a second hook portion 44. The first and second hook portions 42, 44 can have any appropriate shape that can facilitate engagement and disengagement with first and second elastic members 28, 30. In an exemplary embodiment, the first hook portion 42 can have a substantially J-shape, and the second hook portion 44 can have a shape that is a substantially mirror-image of the first hook portion 42. In an exemplary embodiment, the first and second hook portions 42, 44 can be unitarily formed as a single homogenous unit. In another exemplary embodiment, one or both of the hook portions 42, 44 can be formed integrally or as separate components that are subsequently joined together to form the respective first and second hook portions 42, 44.

The elastic members 28, 30 (FIG. 5) can be secured to the rear surface of the head rest 14 by any method or apparatus, such as by stitching, screws, nails, bolts, glue/epoxy, welding, etc. The elastic members 28, 30 can be spaced apart and can engage a respective one of the first and second arm portions 38, 40 of the clamp member 26. The features of the second elastic member 30 can substantially the same as the features of the first elastic member 28, and they can extend parallel to each other.

For brevity, the following discussion is limited to the first elastic member 28. As shown in FIG. 6, the first elastic member 28 can include a base 46 and at least one elastic loop 48. The elastic loop 48 can be configured to removably receive a respective one of the first and second hook portions 42, 44.

The elastic members 28, 30 can be configured to elastically expand if: 1) the clamp member 26 is moved along the rear area of the head rest 14; and 2) the first and second hook portions 42, 44 are engaged with the respective loops of the first and second elastic members 28, 30. This elastic expansion of the elastic members 28, 30 can permit a user of the integrated device holder assembly 16 to adjust the position of the clamp member 26 along the rear surface of the head rest 14 to a position where the clamp member 26 can engage a top portion of the target mobile electronic device 18.

The elastic loop 48 can be positioned at the head rest 14 such that the vertical distance between the top edge of the elastic loop 48 and the bottom of the device pocket 33 is slightly less than the relevant dimension for the target mobile electronic device. As a result, the elastic members 28, 30 can be elastically elongated if: 1) the target mobile electronic device 18 is received in the device pocket 33; and 2) the clamp member 26 engages the mobile electronic device. The reaction force of the elastic members 28, 30 to this elastic elongation can apply a biasing force on the clamp member 26. This biasing force can cause the clamp member 26 to urge the target mobile electronic device toward the device pocket 33, and toward the rear surface of the head rest 14.

Embodiments of the elastic member are intended to include any number of loops. In the exemplary embodiment of FIG. 6, the elastic member 28 includes five elastic loops 48, 50, 52, 54, 56. The elastic loops 48, 50, 52, 54, 56 can be configured to removably receive the first arm portion 38 of the clamp member 26. The elastic loops 48, 50, 52, 54, 56 can be spaced along the base 42. The position of each of the elastic loops 48, 50, 52, 54, 56 can be selected based on the various dimensions of the plurality of mobile electronic devices noted above, the desired biasing force to be applied to the clamp member 26, the force required of a user in order to displace the clamp member 26 an amount sufficient to accommodate the target mobile electronic device, and/or any other relevant functionality or operation. In some embodiments, the first and second elastic members 28, 30 can be spaced apart on the rear area of the head rest 14 by an amount sufficient to promote ease of engagement and/or disengagement of the elastic loops 48, 50, 52, 54, 56 by the first and second arm portions 38, 40 of the clamp member 26.

The first and second arm portions 38, 40 of the clamp member 26 can be removably inserted into a respective one of the elastic loops 48, 50, 52, 54, 56 positioned along the head rest 14 to advantageously accommodate the target mobile electronic device 18. In order to insert a target mobile electronic device 18, the user can displace the clamp member 26 away from the device pocket 33 to release and remove a currently held target mobile electronic device 18, if any. After removal, and assuming that the new target mobile electronic device 18 is of a different size than the removed device, the user can remove the clamp member 26 from the currently engaged elastic loops and insert the first and second arm portions 38, 40 of the clamp member 26 into another pair of elastic loops positioned to advantageously accommodate the new target mobile electronic device 18.

As indicated above, the base 46 can be secured to a rear surface of the head rest 14 in any appropriate manner, such as but not limited to a stitched seam, adhesive, button/hole fastener, snap fastener, clasp fastener, zipper, weld, etc. Each of the plurality of elastic loops 48, 50, 52, 54, 56 can be unitarily formed with the base 46, or alternatively secured to the base 42 in any appropriate manner, such as but not limited to a stitched seam, adhesive, etc.

The seat back trim panel 32 can be secured to a rear area of the seat back 12 that is adjacent the top of the seat back 12. A portion of the seat back trim panel 32 can be free from the seat back 12, such as by being spaced from the seat back 12 to define a gap therebetween. In an exemplary embodiment, the side edges 58, 60 and the bottom edge 62 of the seat back trim panel 32 can be secured to the rear surface of the seat back 12 by any suitable method, such as those disclosed above. The top portion 64 and an interior portion 66 of the seat back trim panel 32 can be free or spaced from the seat back 12. The seat back trim panel 32 is thereby able to cooperate with the rear area surface of the seat back 12 to form the device pocket 33.

The device pocket 33 can be dimensioned to individually accommodate a portion of any one of the plurality of mobile electronic devices disclosed above, as demonstrated, for example, by the first mobile electronic device 18 of FIG. 1 and the second mobile electronic device 20 of FIG. 3. In other words, the device pocket 33 can have any size to accommodate a lower surface of any target mobile electronic device 18.

The device pocket 33 can be sized in combination with the adjustable positioning for the clamp member 26 to accommodate any one of the plurality of mobile electronic devices disclosed above, as demonstrated by FIGS. 1-3. The integrated device holder assembly 16 can thereby attach or hold any one of a plurality of mobile electronic devices at the vehicle seat 10.

The head rest 14 can be configured as an adjustable head rest that can permit an occupant of the vehicle seat 10 to adjust the position of the head rest 14 relative to top of the seat back 12. In this configuration, the head rest 14 can include a pair of posts 15, 17 (FIG. 5) connected to the head rest 14 and extending away from a lower surface of the head rest 14. Each of the posts 15, 17 can include a plurality of notches 19, 21 spaced along the respective post 15 or 17. The seat back 12 can include a pair of mounting holes into which the pair of posts 15, 17 can slide. The mounting holes can each include a biased lock member that can selectively engage and disengage any one of the notches 19, 21 of the respective post 15 or 17. The biased lock member can restrain the head rest 14 in one of a plurality of height positions relative to the seat back 12. Since the device pocket 33 can be positioned on the seat back, and the adjustable head rest 14 can be positioned at any one of a plurality of positions relative to the seat back 12, the adjustable head rest 14 can be adjusted to further enhance the versatility of the integrated device holder assembly 16. In other words, the vertical adjustability of the head rest 14 enables the integrated device holder assembly 16 to accommodate an even larger number of different sized target mobile electronic devices 18.

The first and second trim panels 22, 24 can be secured to the rear area of the head rest 14 to cover a respective one of the first and second elastic members 28, 30 while permitting access by the clamp member 26 to the first and second elastic members 28, 30. The first and second trim panels 22, 24 can cover the elastic members 28, 30 to provide the vehicle occupants with a visually appealing appearance.

The first and second trim panels 22, 24 can be configured to discourage an inappropriate orientation of the clamp member 26 relative to the target mobile electronic device 18, such as in the case of the clamp member 26 adopting an orientation that is ineffective for contacting/holding the target mobile electronic device 18. For example, the first and second trim panels 22, 24 can be dimensioned and secured to the seat back 12 in a manner that can prevent, impede, reduce or minimize undesired movement of the clamp member 26 within the elastic loops 48, 50, 52, 54, 56. However, some embodiments omit the first and second trim panels 22, 24.

A portion of the first trim panel 22 and a portion of the second trim panel 24 can be free from the head rest 14 and cooperate with the rear surface of the head rest 14 to define first and second adjustment pockets. The first and second adjustment pockets can be dimensioned to cover the respective first and second elastic members 28, 30. The first and second adjustment pockets can be dimensioned to accommodate the respective first and second arms 38, 40 of the clamp member 26 as the user moves the clamp member 26 within the adjustment zone of the integrated device holder assembly 16.

In an exemplary embodiment, a first side edge 68, a top edge 70 and a bottom edge 72 of the first trim panel 22 can be secured to the rear surface of the seat back 12. A second side edge 74 and an interior portion 76 of the first trim panel 22 can be free and spaced from the seat back 12. The interior portion 78 of the first trim panel 22 is bounded by the edges 68, 70, 72, 74. In this manner, the first trim panel 22 can cooperate with the rear surface of the head rest 14 to form the first adjustment pocket. A first side edge 78, a top edge 80 and a bottom edge 82 of the second trim panel 24 can be secured to the rear surface of the seat back 12. A second side edge 74 and an interior portion of the second trim panel 24 can be free and spaced from the seat back 12. In this manner, the second trim panel 24 can cooperate with the rear surface of the seat back 12 to form the second adjustment pocket.

The first and second trim panels 22, 24 can be secured to a rear surface of the head rest 14 in any appropriate manner, such as but not limited to a stitched seam, adhesive, button/hole fastener, snap fastener, clasp fastener, zipper, weld, etc.

Similarly, the seat back trim panel 32 can be secured to a rear surface of the seat back 12 in any appropriate manner, such as but not limited to a stitched seam, adhesive, button/hole fastener, snap fastener, clasp fastener, zipper, weld, etc. As discussed above, the elastic members 28, 30 can be configured to have one elastic loop, or alternatively a plurality of elastic loops.

3. Alternative Second Exemplary Clamp Member

Figure 8:
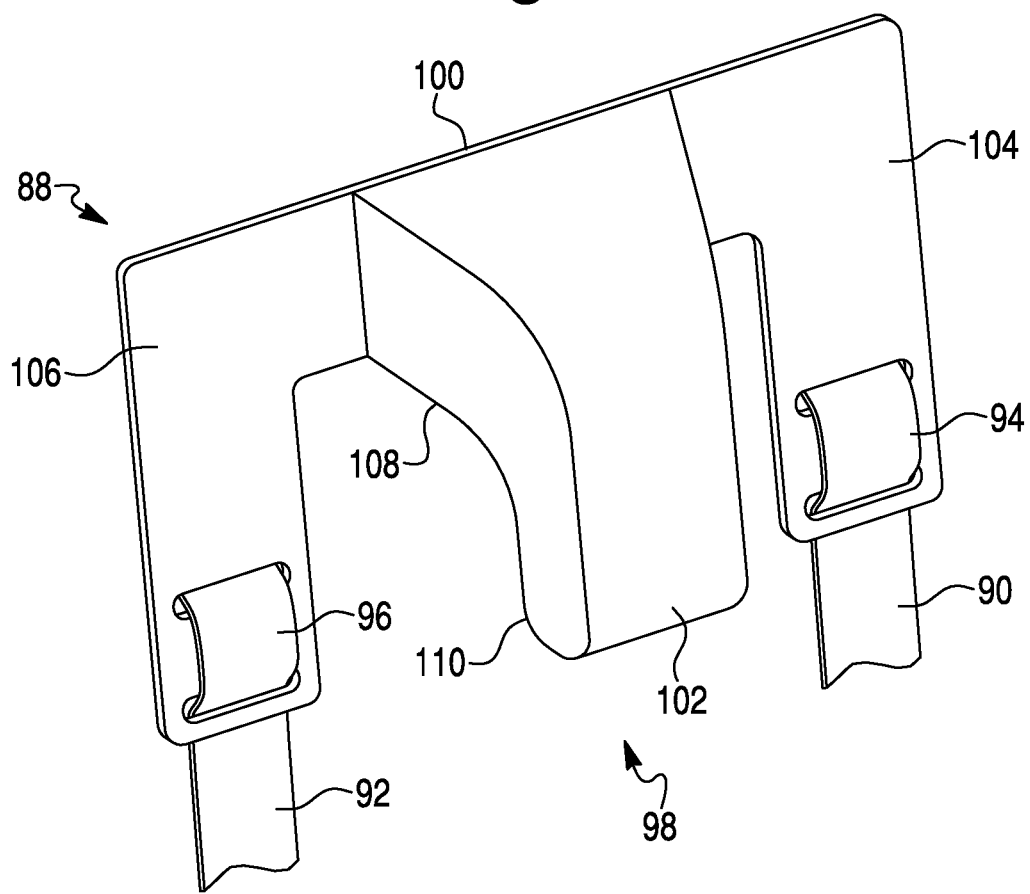
FIG. 8 is a perspective view of an alternative second exemplary clamp member in accordance with the disclosed subject matter.

FIG. 8 is a perspective view of an alternative exemplary clamp member in accordance with the disclosed subject matter. As shown in FIG. 8, an integrated device holder assembly 88 can be symmetrical and include first and second elastic members 90, 92 that each has a respective single elastic loop 94, 96. The integrated device holder assembly 88 can include a clamp member 98. The clamp member 98 can cooperate with the first and second elastic members 90, 92, as discussed above with reference to FIGS. 1-7, to accommodate any one of the plurality of mobile electronic devices regardless of shape or size, and attach or hold the target mobile electronic device 18. Although omitted from FIG. 8 for brevity and clarity, the integrated device holder assembly 88 can include first and second trim panels 22, 24 and a seat back panel 32 as configured in the exemplary embodiment illustrated by FIGS. 1-7.

The clamp member 98 can be configured to have any shape and any dimensions that can permit the clamp member 98 to accommodate any one of the plurality of mobile electronic devices disclosed above. In an exemplary embodiment, the clamp member 98 can include a central portion 100, a nose portion 102 extending from the central portion 100, a first arm portion 104 extending from the central portion 100, and a second arm portion 106 extending from the central portion 100. In an exemplary embodiment, the portions 100, 102, 104, 106 of the clamp member 98 can be unitarily formed as a single homogenous unit. In another exemplary embodiment, the one or more of the portions 100, 102, 104, 106 of the clamp member 98 can be integrally formed or formed as separate components that are joined together to form the clamp member 98.

The nose portion 102 can have any configuration to engage the target mobile electronic device 18 if received by the integrated device holder assembly 88. The nose portion 102 can include a first portion 108 and a second portion 110. The first portion 108 of the nose portion 102 can extend away from the central portion 100 of the clamp member 98. The second portion 110 of the nose portion 102 can extend from the first portion 108 at an angle. The second portion 110 of the nose portion 102 can extend toward the device pocket 33. The second portion 110 can include a bottom surface that can lie in a plane that is spaced from the central portion 100 and the first and second arm portions 104, 106. The bottom surface of the second portion 110 of the nose portion 102 can engage the target mobile electronic device.

The first arm portion 104 can be connected to the elastic loop 94 of the first elastic member 90 in any appropriate manner. Similarly, the second arm portion 106 can be connected to the elastic loop 96 of the second elastic member 92 in any appropriate manner. The second arm portion 106 can extend in a direction that can be substantially parallel to the direction in which the first arm portion 104 extends. The second arm portion 106 can extend away from the central portion 100 in a direction substantially opposite to that in which the first arm portion 104 extends.

The elasticity of the elastic members 90, 92 can permit the clamp member 98 to be positioned at any one of a plurality of positions relative to the seat back 12. Thus, the integrated device holder assembly 88 can attach any of the plurality of mobile electronic devices to the vehicle seat 10. Since the device pocket 33 can be positioned on the seat back, and the adjustable head rest 14 can be positioned at any one of a plurality of positions relative to the seat back 12, the adjustable head rest 14 can be adjusted to further enhance the versatility of the integrated device holder assembly 88. In other words, the vertical adjustability of the head rest 14 enables the integrated device holder assembly 88 to accommodate an even larger number of different sized target mobile electronic devices 18.

The elastic members 90, 92 can be secured to the head rest 14 in any appropriate manner, such as but not limited to a stitched seam, adhesive, button/hole fastener, snap fastener, clasp fastener, weld, etc.

4. Second Embodiment

Figure 9:
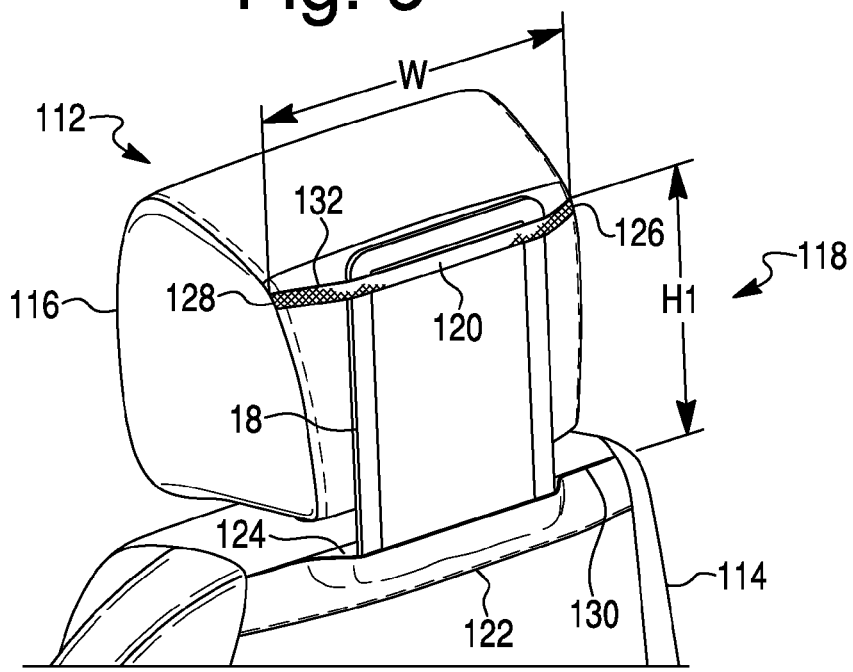
FIG. 9 is a partial rear perspective view of a vehicle seat and exemplary second embodiment of an integrated device holder assembly in accordance with the disclosed subject matter, with the assembly holding the first mobile electronic device in the second orientation.

FIG. 9 is a partial rear perspective view of a vehicle seat and exemplary second embodiment of an integrated device holder assembly in accordance with the disclosed subject matter, with the assembly holding the first mobile electronic device in the second orientation.

As with the previous embodiment, the vehicle seat 112 of FIG. 9 is intended to include or otherwise cover any type of seat. The vehicle seat 112 can include a seat back 114, a head rest 116, and an integrated device holder assembly 118. The assembly 118 can removably attach or hold any one of the plurality of mobile electronic devices. FIG. 9 illustrates the first mobile electronic device 18 as an exemplary target mobile electronic device, however as with the previous embodiment, the assembly 118 is intended to attach or hold any type of mobile electronic device.

The integrated device holder assembly 118 can include an elastic member 120 and a seat back trim panel 122. The seat back trim panel 122 can be configured and secured to the seat back 114, as described above with respect to the seat back trim panel 32 of FIGS. 1-4, to form a device pocket 124 with the rear surface of the seat back 114. The elastic member 120 can cooperate with the device pocket 124 to attach or hold any of the plurality of mobile electronic devices disclosed above.

The elastic member 120 can be configured to engage the target mobile electronic device 18 to bias the mobile electronic device toward the rear surface of the head rest 116. The elastic member 120 can include first and second ends 126, 128 connected to the head rest 116 in any appropriate manner, such as but not limited to a stitched seam, adhesive, button/hole fastener, snap fastener, clasp fastener, weld, etc. The elastic member 120 can be configured to elastically elongate between the first and second ends 126, 128 in order receive the target mobile electronic device 18. The reaction force in the elastic member 120 to this elastic elongation can apply a biasing force on the mobile electronic device 18 that can urge the mobile electronic device toward the rear surface of the head rest 116.

The elastic member 120 can extend substantially horizontally across the rear surface of the head rest 116 spaced at a predetermined distance from the device pocket 124. However, embodiments are intended to cover or otherwise include elastic members 120 that extend across the rear surface of the head rest 116 at any angle or orientation. The predetermined distance can be set to accommodate any of the plurality of mobile electronic devices. The predetermined distance from the device pocket 124 can be set to permit the elastic member 120 to engage the target mobile electronic device at a location on the target mobile electronic device that is closer to the upper edge of the mobile electronic device than to the lower edge of the mobile electronic device. The predetermined distance can be set to permit the integrated device holder assembly 118 to attach a target mobile electronic device that has a width that is less than the width W, and a height that is greater than or equal to a first height H1. The first height H1 can be measured between the top edge 130 of the device pocket 124 and the top edge of the elastic member 120, as illustrated in FIG. 9.

Thus, the integrated device holder assembly 118 can attach any type of mobile electronic device to the vehicle seat 112. The head rest 116 can be configured as an adjustable head rest, as described above with respect to FIG. 1-7. Since the device pocket 124 can be positioned on the seat back 114, and the adjustable head rest 116 can be positioned at any one of a plurality of positions relative to the seat back 114, the adjustable head rest 116 can be adjusted to further enhance the versatility of the integrated device holder assembly 118. In other words, the vertical adjustability of the head rest 116 enables the integrated device holder assembly 118 to accommodate an even larger number of different sized target mobile electronic devices.

5. Third Embodiment

Figure 10:
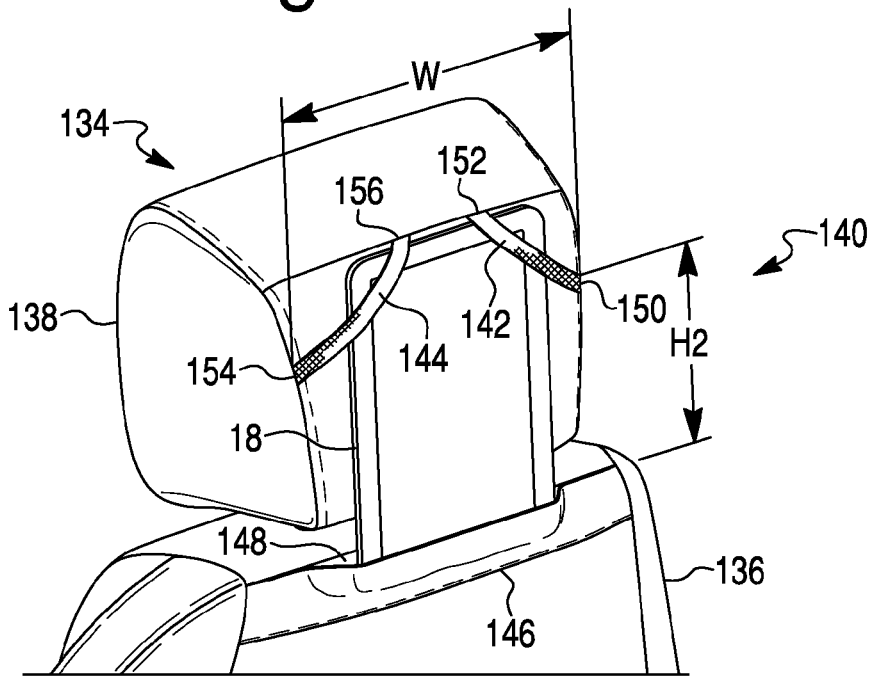
FIG. 10 is a partial rear perspective view of a vehicle seat and exemplary third embodiment of an integrated device holder assembly in accordance with the disclosed subject matter, with the assembly holding the first mobile electronic device in the second orientation.

FIG. 10 is a partial rear perspective view of a vehicle seat and exemplary third embodiment of an integrated device holder assembly in accordance with the disclosed subject matter, with the assembly holding the first mobile electronic device in the second orientation.

As with the previous embodiments, the vehicle seat 134 of FIG. 10 is intended to include or otherwise cover any type of seat. The vehicle seat 134 can include a seat back 136, head rest 138, and integrated device holder assembly 140. The assembly 140 can removably attach or hold any type of mobile electronic devices, as disclosed above regarding the previous embodiments. FIG. 10 illustrates the first mobile electronic device 18 as an exemplary target mobile electronic device.

The integrated device holder assembly 140 can include first and second elastic members 142, 144 and a seat back trim panel 146. The seat back trim panel 146 can be configured and secured to the seat back 136, as described above with respect to the seat back trim panel 32 of FIGS. 1-4, to form a device pocket 148 with the rear surface of the seat back 136. The first and second elastic members 142, 144 can cooperate with the device pocket 148 to attach any of the plurality of mobile electronic devices to the vehicle seat 134.

The first and second elastic members 142, 144 can be configured to engage the target mobile electronic device to bias the mobile electronic device toward the rear surface of the head rest 138. The first elastic member 142 can include first and second ends 126, 128 connected to the head rest 138 at different vertical positions, so that the first elastic member 142 can extend along the rear surface of the head rest 138 at an angle relative to a plane of the screen of the mobile electronic device. The second elastic member 144 can include first and second ends 154, 156 connected to the head rest 138 at different vertical positions, so that the second elastic member 144 can extend along the rear surface of the head rest 138 at an angle relative to a plane of the screen of the mobile electronic device. The second elastic member 144 can be secured to the head rest as a mirror image of the first elastic member 142. The first and second elastic members 142, 144 can be connected to the head rest 138 in any appropriate manner such as but not limited to a stitched seam, an adhesive, a button/hole fastener, a snap fastener, and a clasp fastener, weld, etc.

The first and second elastic members 142, 144 can be configured to elastically elongate between their first and second ends 150, 152, 154, 156 in order receive the target mobile electronic device. The reaction force in the first and second elastic members 142, 144 to this elastic elongation can apply a biasing force on the mobile electronic device that can urge the mobile electronic device toward the rear surface of the head rest 138.

The first and second elastic members 142, 144 can extend along the rear surface of the head rest 138 spaced at a predetermined distance from the device pocket 148. The predetermined distance can be set to accommodate any of the plurality of mobile electronic devices. The predetermined distance can be set to permit the first and second elastic members 142, 144 to engage the target mobile electronic device at a location on the target mobile electronic device that is closer to the upper edge of the mobile electronic device than to the lower edge of the mobile electronic device. The predetermined distance can be set to permit the integrated device holder assembly 140 to attach a target mobile electronic device that has a width less than the width W, and a height greater than or equal to a second height H2. The second height H2 can be measured between the top edge 130 of the device pocket 124 and the top edge of the elastic member 120, as illustrated in FIG. 10. The second height H2 can be less than the first height H1 illustrated by FIG. 9.

Thus, the integrated device holder assembly 140 can attach any of a plurality of mobile electronic devices to the vehicle seat 134. The head rest 138 can be configured as an adjustable head rest as described above with respect to FIG. 1-7. Since the device pocket 146 can be positioned on the seat back 136 and the adjustable head rest 138 can be positioned at any one of a plurality of positions relative to the seat back 136, the adjustable head rest 138 can be adjusted to further enhance the versatility of the integrated device holder assembly 140. In other words, the vertical adjustability of the head rest 138 enables the integrated device holder assembly 140 to accommodate an even larger number of different sized target mobile electronic devices.

6. Fourth Embodiment

Figure 11:
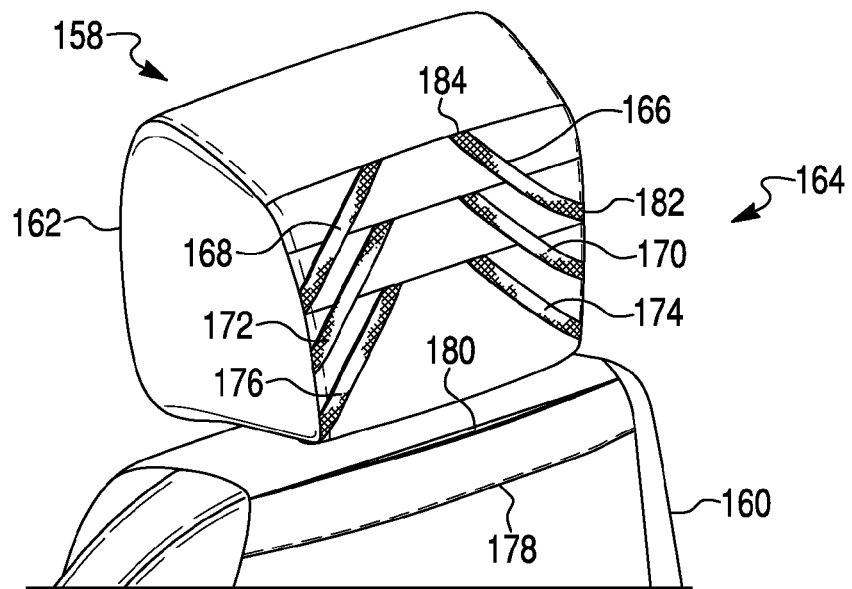
FIG. 11 is a partial rear perspective view of a vehicle seat and exemplary fourth embodiment of an integrated device holder assembly in accordance with the disclosed subject matter.

FIG. 11 is a partial rear perspective view of a vehicle seat and exemplary fourth embodiment of an integrated device holder assembly in accordance with the disclosed subject matter.

As with the previous embodiments, the vehicle seat 158 of FIG. 11 is intended to include or otherwise cover any type of seat. The vehicle seat 158 can include a seat back 160, a head rest 162 and an integrated device holder assembly 164. The assembly 164 can removably attach or hold any type of mobile electronic devices, as disclosed above regarding the previous embodiments. The target mobile electronic device has been omitted from FIG. 11 for clarity of the drawing.

The integrated device holder assembly 164 can include a plurality of elastic members 166, 168, 170, 172, 174, 176 and a seat back trim panel 178. The seat back trim panel 178 can be configured and secured to the seat back 160, as described above with respect to the seat back trim panel 32 of FIGS. 1-4, to form a device pocket 180 with the rear surface of the seat back 160. The elastic members can cooperate with the device pocket 180 to attach any of the plurality of mobile electronic devices to the vehicle seat 158.

Embodiments are intended to include any number of elastic members. In the embodiment of FIG. 11, the elastic members 166, 168, 170, 172, 174, 176 can be arranged in pairs. Each pair of elastic members 166, 168; 170, 172; 174, 176 can be configured to engage the target mobile electronic device to bias the mobile electronic device toward the rear surface of the head rest 162. The first elastic member 166 can include first and second ends 182, 184 connected to the head rest 162 at different vertical positions, so that the first elastic member 166 can extend along the rear surface of the head rest 162 at an angle relative to a plane of the screen of the mobile electronic device. The second, third, fourth, fifth and sixth elastic members 168, 170, 172, 174, 176 can include first and second ends connected to the head rest 162 at different vertical positions, so that the second, third, fourth, fifth and sixth elastic members 168, 170, 172, 174, 176 can extend along the rear surface of the head rest 162 at an angle relative to a plane of the screen of the mobile electronic device. The second, fourth and sixth elastic members 168, 172, 176 can be secured to the head rest as a mirror image of the first, third and fifth elastic members 166, 170, 174, respectively. The second, fourth and sixth elastic members 168, 172, 176 can extend substantially parallel to one another and the first, third and fifth elastic members 166, 170, 174 can extend substantially parallel to one another. The elastic members 166, 168, 170, 172, 174, 176 can be connected to the head rest 162 in any appropriate manner, such as but not limited to a stitched seam, adhesive, button/hole fastener, snap fastener, clasp fastener, weld, etc.

The elastic members 166, 168, 170, 172, 174, 176 can be configured to elastically elongate between their first and second ends in order receive the target mobile electronic device. The reaction force in the elastic members 166, 168, 170, 172, 174, 176 in response to this elastic elongation can apply a biasing force on the mobile electronic device that can urge the target mobile electronic device toward the rear surface of the head rest 162.

Each pair of the elastic members 166, 168, 170, 172, 174, 176 can extend along the rear surface of the head rest 162 and be spaced at a respective predetermined distance from the device pocket 180. Each respective predetermined distance can be set to accommodate a respective subset of the plurality of mobile electronic devices. Each predetermined distance can be set to permit the respective pair of the elastic members 166, 168, 170, 172, 174, 176 to engage the target mobile electronic device at a location on the target mobile electronic device that is closer to the upper edge of the mobile electronic device than to the lower edge of the mobile electronic device. Each predetermined distance can be set to permit the integrated device holder assembly 164 to attach a target mobile electronic device that has a width less than the width W (see FIG. 10), and a height greater than or equal to the distance from the top of the device pocket 180 to the second end of the elastic members of the respective pair (e.g., the second end 184 of the first elastic member 166). The height associated with a third pair of the elastic members 174, 176 can be less than the height associated with a second pair of the elastic members 170, 172, which can be less than the height associated with the a first pair of the elastic members 166, 168.

Thus, the integrated device holder assembly 164 can attach any of a plurality of mobile electronic devices to the vehicle seat 158. The head rest 162 can be configured as an adjustable head rest as described above with respect to FIG. 1-7. Since the device pocket 180 can be positioned on the seat back 160 and the adjustable head rest 162 can be positioned at any one of a plurality of positions relative to the seat back 160, the adjustable head rest 162 can be adjusted to further enhance the versatility of the integrated device holder assembly 164. In other words, the vertical adjustability of the head rest 162 enables the integrated device holder assembly 164 to accommodate an even larger number of different sized target mobile electronic devices.

7. Fifth Embodiment

Figure 12:
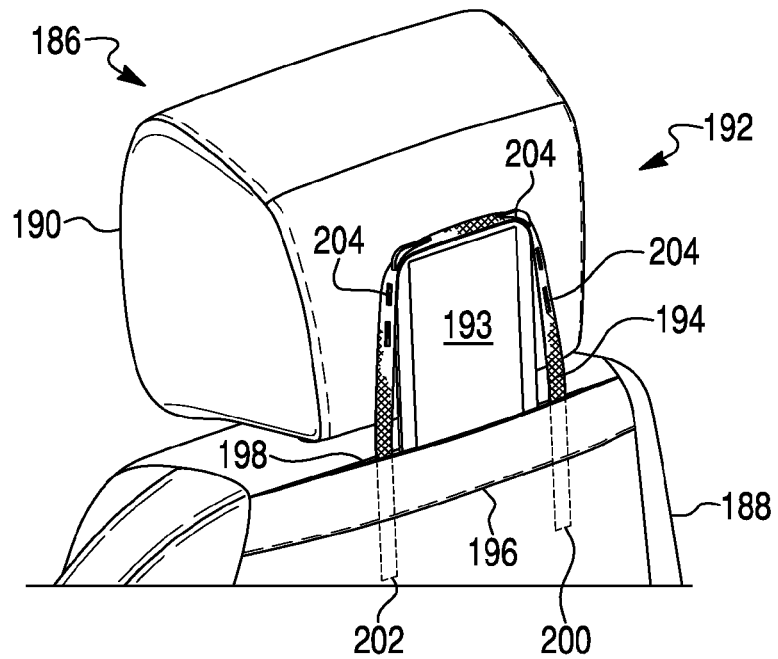
FIG. 12 is a partial rear perspective view of a vehicle seat and exemplary fifth embodiment of an integrated device holder assembly in accordance with the disclosed subject matter, with the assembly holding a third exemplary mobile electronic device.

FIG. 12 is a partial rear perspective view of a vehicle seat and exemplary fifth embodiment of an integrated device holder assembly in accordance with the disclosed subject matter, with the assembly holding a third exemplary mobile electronic device.

As with the previous embodiments, the vehicle seat 186 of FIG. 12 is intended to include or otherwise cover any type of seat. The vehicle seat 186 can include a seat back 188, a head rest 190 and an integrated device holder assembly 192. The assembly 192 can removably attach or hold any one of the plurality of mobile electronic devices disclosed above. FIG. 12 illustrates a third mobile electronic device 193 as an exemplary target mobile electronic device. The third mobile electronic device 193 can be different in size and/or shape from the first mobile electronic device 18 and/or the second mobile electronic device 20.

The integrated device holder assembly 192 can include an elastic member 194 and a seat back trim panel 196. The seat back trim panel 196 can be configured and secured to the seat back 188, as described above with respect to the seat back trim panel 32 of FIGS. 1-4, to form a device pocket 198 with the rear surface of the seat back 188. The elastic member 194 can cooperate with the device pocket 198 to attach the plurality of mobile electronic devices to the vehicle seat 186.

The elastic member 194 can be configured to engage the target mobile electronic device to bias the mobile electronic device toward the device pocket 198. The elastic member 194 can include first and second ends 200, 202 connected to the seat back 188. The elastic member 194 can be configured to elastically elongate between the first and second ends 200, 202 in order receive the target mobile electronic device. The reaction force in the elastic member 194 to this elastic elongation can apply a biasing force on the mobile electronic device that can urge the mobile electronic device toward the device pocket 198.

The first and second ends 200, 202 can be connected to the seat back 188 in any appropriate manner such as but not limited to a stitched seam, an adhesive, a button/hole fastener, a snap fastener, a weld, and a clasp fastener. The first and second ends 200, 202 can be attached to the seat back 188 at any advantageous position along the seat back. In an exemplary embodiment, the first and second ends 200, 202 can be attached to the seat back 188 at a position below the seat back trim panel 196. In another exemplary embodiment, the first and second ends 200, 202 can be connected to the seat back 188 at a position with the extent of the seat back trim panel 196. In some of these embodiments, the first and second ends 200, 202 can be connected to the seat back 188 at the same location of connection of the seat back trim panel 196.

The elastic member 194 can include a plurality of slits 204 spaced along its length. The slits 204 can be configured to engage in respective pairs of buttons or attachment structures or corners on the target mobile electronic device. The slits 204 can be configured to allow a respective corner of the target mobile electronic device to pass though the engaged pair of slits 204. The slits 204 can be spaced at predetermined intervals in order to accommodate any of the plurality of mobile electronic devices.

Thus, the integrated device holder assembly 192 can attach any of the plurality of mobile electronic devices to the vehicle seat 186. The head rest 190 can be configured as an adjustable head rest, as described above with respect to FIG. 1-7. Since the device pocket 198 can be positioned on the seat back 188, and the adjustable head rest 190 can be positioned at any one of a plurality of positions relative to the seat back 188, the adjustable head rest 190 can be adjusted to further enhance the versatility of the integrated device holder assembly 192. In other words, the vertical adjustability of the head rest 190 enables the integrated device holder assembly 192 to accommodate an even larger number of different sized target mobile electronic devices.

8. Sixth Embodiment

Figure 13:
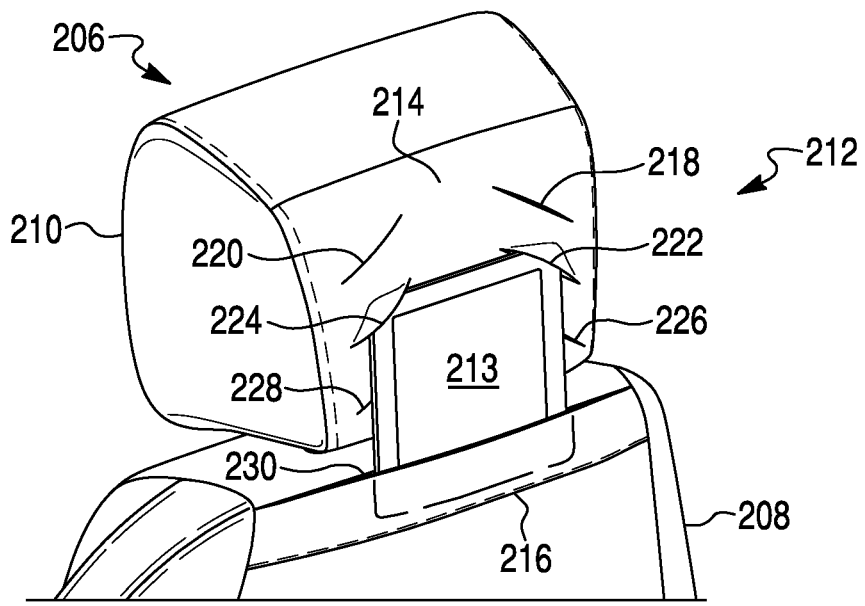
FIG. 13 is a partial rear perspective view of a vehicle seat and exemplary sixth embodiment of an integrated device holder assembly in accordance with the disclosed subject matter, with the assembly holding a fourth exemplary mobile electronic device.

FIG. 13 is a partial rear perspective view of a vehicle seat and exemplary sixth embodiment of an integrated device holder assembly in accordance with the disclosed subject matter, with the assembly holding a fourth exemplary mobile electronic device.

As with the previous embodiments, the vehicle seat 206 of FIG. 13 is intended to include or otherwise cover any type of seat. The vehicle seat 206 can include a seat back 208, a head rest 210 and an integrated device holder assembly 212. The assembly 212 can removably attach or hold any one of the plurality of mobile electronic devices disclosed above. FIG. 13 illustrates the fourth mobile electronic device 213 as an exemplary target mobile electronic device. The fourth mobile electronic device 213 can be different in size and/or shape from the first mobile electronic device 18, and/or the second mobile electronic device 20, and/or the third mobile electronic device 193.

The integrated device holder assembly 212 can include a head rest trim panel 214 and a seat back trim panel 216. The head rest trim panel 214 can include a plurality of slits 218, 220, 222, 224, 226, 228 that can be arranged in pairs. The head rest trim panel 214 can be secured to the rear surface of the head rest 210 in any appropriate manner, such as but not limited to a stitched seam, adhesive, button/hole fastener, snap fastener, clasp fastener, zipper, weld, etc. In an alternate embodiment, the head rest trim panel 214 can be a portion of the trim cover for the head rest 210, which forms the outer surface of the head rest 210. The seat back trim panel 216 can be configured and secured to the seat back 208, as described above with respect to the seat back trim panel 32 of FIGS. 1-4, to form a device pocket 230 with the rear surface of the seat back 208. The plurality of slits 218, 220, 222, 224, 226, 228 can cooperate with the device pocket 230 to attach any of the plurality of mobile electronic devices to the vehicle seat 206.

The plurality of slits 218, 220, 222, 224, 226, 228 can be arranged in pairs. Each pair of the slit 218, 220, 222, 224, 226, 228 can be configured to engage the target mobile electronic device to attach an upper portion of the target mobile electronic device to the head rest 210. The first elastic member 166 can include first and second ends 182, 184 connected to the head rest 210 at different vertical positions, so that the first elastic member 166 can extend along the rear surface of the head rest 210 at an angle relative to a plane of a screen of the mobile electronic device. The plurality of slits 218, 220, 222, 224, 226, 228 can extend along the rear surface of the head rest 210 at an angle relative to a plane of a screen of the mobile electronic device. The second, fourth and sixth slits 220, 224, 228 can be secured to the head rest as a mirror image of the first, third and fifth slits 218, 222, 226, respectively. The first, third and fifth slits 218, 222, 226 can extend substantially parallel to one another. The second, fourth and sixth slits 220, 224, 228 can extend substantially parallel to one another.

Each pair of the slits 218, 220, 222, 224, 226, 228 can extend along the rear surface of the head rest 210 and be spaced at a respective predetermined distance from the device pocket 230. Each respective predetermined distance can be set to accommodate a respective subset of the plurality of mobile electronic devices. Each predetermined distance can be set to permit the respective pair of the slits 218, 220, 222, 224, 226, 228 to engage the target mobile electronic device at a location on the target mobile electronic device that is closer to the upper edge of the mobile electronic device than to the lower edge of the mobile electronic device. Each predetermined distance can be set to permit the integrated device holder assembly 212 to attach a target mobile electronic device that has a width less than the width of the device pocket 230, and a substantially equal to the distance from the top of the device pocket 180 to the farthest point on the respective pair of slits. The height associated with a third pair of the slits 226, 228 can be less than the height associated with a second pair of the slits 222, 224, which can be less than the height associated with the a first pair of the slits 218, 220.

Thus, the integrated device holder assembly 212 can attach any of a plurality of mobile electronic devices to the vehicle seat 206. The head rest 210 can be configured as an adjustable head rest, as described above with respect to FIG. 1-7. Since the device pocket 230 can be positioned on the seat back 208 and the adjustable head rest 210 can be positioned at any one of a plurality of positions relative to the seat back 208, the adjustable head rest 210 can be adjusted to further enhance the versatility of the integrated device holder assembly 212. In other words, the vertical adjustability of the head rest 210 enables the integrated device holder assembly 212 to accommodate an even larger number of different sized target mobile electronic devices.

9. Seventh Embodiment

Figure 14:
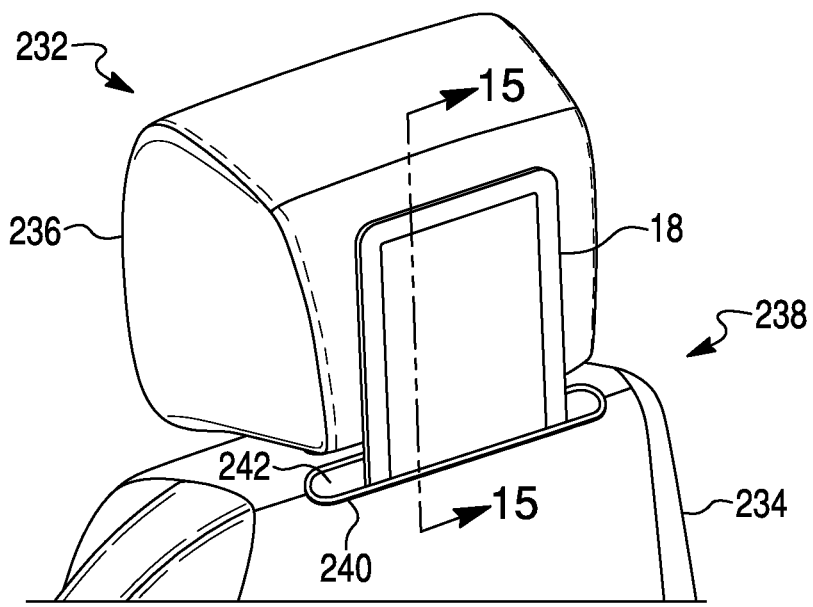
FIG. 14 is a partial rear perspective view of a vehicle seat and exemplary seventh embodiment of an integrated device holder assembly in accordance with the disclosed subject matter, with the assembly holding the first mobile electronic device in the second orientation.
Figure 15:
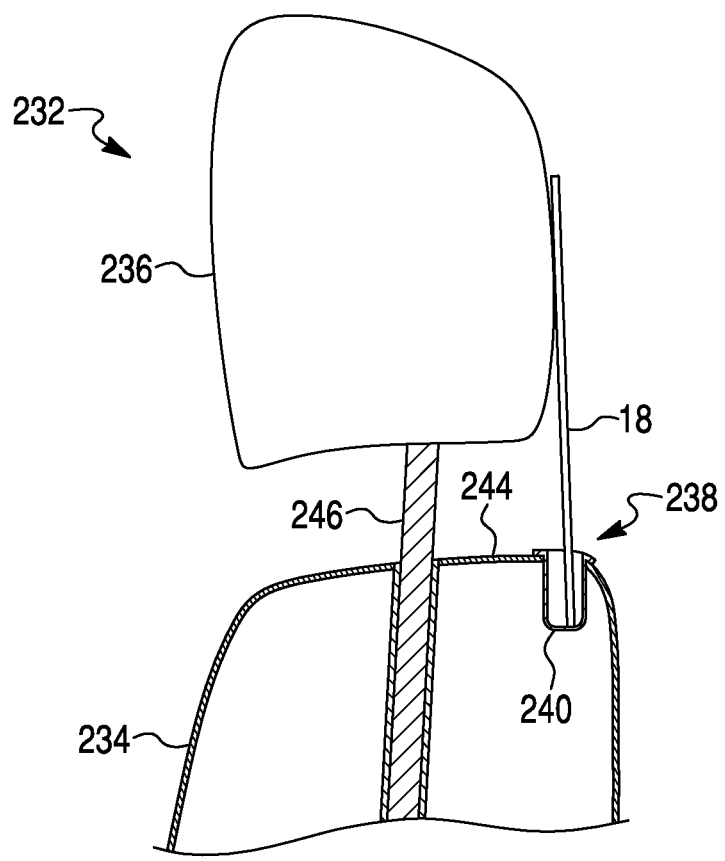
FIG. 15 is a cross-sectional view taken along line 15-15 of FIG. 14.

As with the previous embodiments, the vehicle seat 232 of FIGS. 14 and 15 is intended to include or otherwise cover any type of seat. The vehicle seat 232 can include a seat back 234, a head rest 236 and an integrated device holder assembly 238. The assembly 238 can removably attach or hold any one of the plurality of mobile electronic devices disclosed above. FIGS. 14 and 15 illustrate the first mobile electronic device as an exemplary target mobile electronic device.

The integrated device holder assembly 238 can include a device pocket 240 formed in the seat back 234. The device pocket 240 can extend inwardly of the seat back 234 from an opening 242 located adjacent the top 244 of the seat back 234. The device pocket 238 can extend into the seat back 234 a predetermined distance so that it can advantageously support any of the plurality of mobile electronic devices for viewing the mobile electronic device's display. The device pocket 240 can receive a lower portion of the target mobile electronic device, and the rear surface of the head rest 236 can support an upper portion of the target mobile electronic device.

The device pocket 240 can be configured as a rigid member that can be provided in a cavity formed in the seat back 234. In an alternative embodiment, the device pocket 240 can be configured as a fabric pocket that extends into a cavity formed in the seat back 234.

The device pocket 240 can include a biased portion that can engage the target mobile electronic device to clamp the target mobile electronic device in the device pocket 240.

The head rest 210 can be configured as an adjustable head rest as described above with respect to FIG. 1-7. FIG. 15 shows one post 246 in cross-section. The head rest can include a second post, and this pair of posts can be configured similarly as the posts 15, 17 of FIG. 6. Since the device pocket 240 can be positioned on the seat back 234, and the adjustable head rest 236 can be positioned at any one of a plurality of positions relative to the seat back 234, the adjustable head rest 236 can be adjusted to further enhance the versatility of the integrated device holder assembly 238. In other words, the vertical adjustability of the head rest 236 enables the integrated device holder assembly 238 to accommodate an even larger number of different sized target mobile electronic devices.

10. Alternative Embodiments

Exemplary embodiments are intended to cover all configurations of integrated device holder assemblies that perform the above operations. For example, embodiments are intended to cover or otherwise include all structures, which are integrated with the rear of a vehicle seat, for holding a mobile electronic device in an orientation to enable a passenger in a rear compartment of the vehicle to view the screen of the device. Embodiments are intended to be applied to any type of vehicle, and any type of mobile electronic device.

In addition, any of the embodiments can include a separate electronic communications port installed within each respective assembly to enable a user to connect the mobile device to a control system in order to control, operate, or view various systems of a vehicle, room, arena, etc., such as a stereo, climate control, window operations, movie/DVD, etc. Alternatively, the communications port can simply provide a recharging capability for the mobile device while located within the assembly. The connection can also allow networking between different mobile devices located in the vehicle or arena or other area in which the assembly is located, thus facilitating interactive play during a vehicle trip or arena event, etc.

As disclosed above, the vehicle seat can include a seat back, seat bottom, and head rest. Each of these elements can include various sub-elements. For example, the seat back can include a frame, padding and a cover. The padding and the cover can be attached the frame to constitute the completed seat back shown in the figures. The seat back can be connected to the seat bottom so that the seat back can pivot about a horizontal axis and relative to the seat bottom. The seat bottom can be configured for attachment to a mounting structure of the vehicle that can permit the vehicle seat to slide and/or pivot about a horizontal axis and relative to the floor of the vehicle. The head rest can be movably connected to the seat back. In an alternative embodiment, the head rest can be rigidly fixed to the seat back. In another alternative embodiment, the head rest can be integrally formed with the seat back.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A holder assembly, which is integrated with a rear of a vehicle seat, for holding a mobile electronic device in an orientation to enable a passenger in a rear compartment of the vehicle to view a screen of the mobile electronic device, the holder assembly comprising:
  a lower covering portion that covers and thereby retains a lowermost portion of the mobile electronic device, the lower covering portion being integrated with the rear of the vehicle seat; and
  an upper portion for supporting a top portion of the mobile electronic device, the upper support portion being integrated with the rear of the vehicle seat, the upper support portion and lower covering portion being configured to cooperatively: 1) hold the mobile electronic device in the orientation to enable the passenger in the rear compartment of the vehicle to view the screen of the mobile electronic device upon the mobile electronic device being manually engaged with the holder assembly, and 2) enable the manual disengagement of the mobile electronic device from the holder assembly.

2. The holder assembly according to claim 1, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a clamp member having arm portions at horizontally spaced ends and a nose portion between the arm portions that contacts an upper surface of the mobile electronic device, the upper support member also including a pair of elongated vertically extending elastic members, each of the elastic members including an intermediate portion that contacts one of the arm portions of the clamp member to bias the clamp member toward a rear surface of the head rest to thereby impart a frictional force between the mobile electronic device and the rear surface of the head rest.

3. The holder assembly according to claim 2, wherein each of the arm portions of the clamp member defines a hook-shaped portion that facilitates engagement with the corresponding elastic member, and the nose portion of the clamp member is formed in the shape of a compound curve to enhance contact with the upper surface of the mobile electronic device.

4. The holder assembly according to claim 3, wherein each elastic member includes a base that is secured to the rear surface of the head rest and a plurality of elastic loops opposing the base, each loop being configured to removably receive one of the hook-shaped portions of the clamp member, the loops being vertically aligned between the elastic members to enable the clamp member to be disposed and held at different vertical positions along the rear surface of the head rest.

5. The holder assembly according to claim 1, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes an elongated elastic member that extends horizontally relative to a screen of the mobile electronic device, the elastic member including ends that are secured to a rear surface of the head rest such that an intermediate portion of the elastic member contacts a portion of the mobile electronic device across an upper surface thereof to bias the mobile electronic device toward the rear surface of the head rest.

6. The holder assembly according to claim 1, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a pair of elongated elastic members that each extend at an angle relative to a screen of the mobile electronic device, each of the elastic members including ends that are secured to a rear surface of the head rest such that an intermediate portion of the elastic member contacts a portion of the mobile electronic device adjacent an upper corner thereof to bias the mobile electronic device toward the rear surface of the head rest.

7. The holder assembly according to claim 1, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a plurality of elongated elastic members arranged in pairs and extending at an angle relative to a screen of the mobile electronic device, each of the elastic members including ends that are secured to a rear surface of the head rest such that an intermediate portion of the elastic member contacts a portion of the mobile electronic device adjacent an upper corner thereof to bias the mobile electronic device toward the rear surface of the head rest, each of the pairs of elastic members being vertically spaced from other pairs of elastic members to enable engagement with mobile electronic devices of different sizes.

8. The holder assembly according to claim 1, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes an elastic member with ends secured to the seat back such that an intermediate portion of the elastic member contacts an upper surface of the mobile electronic device to bias the mobile electronic device toward and into the device pocket.

9. The holder assembly according to claim 1, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a head rest trim panel that is disposed at a rear surface of the head rest, the head rest trim panel defining a plurality of pairs of slits that engage upper corners of the mobile electronic device, each of the pairs of slits being vertically spaced from other pairs of slits to enable engagement with mobile electronic devices of different sizes.

10. The holder assembly according to claim 1, wherein the vehicle seat includes a seat back and a head rest, the lower covering portion is constituted by a cavity defined in an upper surface of the seat back, and the upper support portion is constituted by a rear surface of the head rest against which an upper portion of the mobile electronic device rests.

11. A seat assembly for use with a vehicle and a mobile electronic device that is operable by a passenger in a rear compartment of the vehicle, the seat assembly comprising;
a vehicle seat defining a rear;
a holder assembly, which is integrated with the rear of the vehicle seat, for holding the mobile electronic device in an orientation to enable the passenger in the rear compartment of the vehicle to view the screen of the mobile electronic device, the holder assembly including:
a lower covering portion that covers and thereby retains a lowermost portion of the mobile electronic device, the lower covering portion being integrated with the rear of the vehicle seat; and
an upper support portion for supporting a top portion of the mobile electronic device, the upper support portion being integrated with the rear of the vehicle seat, the upper support portion and lower covering portion being configured to cooperatively: 1) hold the mobile electronic device in the orientation to enable the passenger in the rear compartment of the vehicle to view the screen of the mobile electronic device upon the mobile electronic device being manually engaged with the holder assembly, and 2) enable the manual disengagement of the mobile electronic device from the holder assembly.

12. The seat assembly according to claim 11, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a clamp member having arm portions at horizontally spaced ends and a nose portion between the arm portions that contacts an upper surface of the mobile electronic device, the upper support member also including a pair of elongated vertically extending elastic members, each of the elastic members including an intermediate portion that contacts one of the arm portions of the clamp member to bias the clamp member toward a rear surface of the head rest to thereby impart a frictional force between the mobile electronic device and the rear surface of the head rest.

13. The seat assembly according to claim 12, wherein:
each of the arm portions of the clamp member defines a hook-shaped portion that facilitates engagement with the corresponding elastic member, and the nose portion of the clamp member is formed in the shape of a compound curve to enhance contact with the upper surface of the mobile electronic device; and
each elastic member includes a base that is secured to the rear surface of the head rest and a plurality of elastic loops opposing the base, each loop being configured to removably receive one of the hook-shaped portions of the clamp member, the loops being vertically aligned between the elastic members to enable the clamp member to be disposed and held at different vertical positions along the rear surface of the head rest.

14. The seat assembly according to claim 11, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes an elongated elastic member that extends horizontally relative to a screen of the mobile electronic device, the elastic member including ends that are secured to a rear surface of the head rest such that an intermediate portion of the elastic member contacts a portion of the mobile electronic device across an upper surface thereof to bias the mobile electronic device toward the rear surface of the head rest.

15. The seat assembly according to claim 11, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a pair of elongated elastic members that each extend at an angle relative to a screen of the mobile electronic device, each of the elastic members including ends that are secured to a rear surface of the head rest such that an intermediate portion of the elastic member contacts a portion of the mobile electronic device adjacent an upper corner thereof to bias the mobile electronic device toward the rear surface of the head rest.

16. The seat assembly according to claim 11, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a plurality of elongated elastic members arranged in pairs and extending at an angle relative to a screen of the mobile electronic device, each of the elastic members including ends that are secured to a rear surface of the head rest such that an intermediate portion of the elastic member contacts a portion of the mobile electronic device adjacent an upper corner thereof to bias the mobile electronic device toward the rear surface of the head rest, each of the pairs of elastic members being vertically spaced from other pairs of elastic members to enable engagement with mobile electronic devices of different sizes.

17. The seat assembly according to claim 11, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes an elastic member with ends secured to the seat back such that an intermediate portion of the elastic member contacts an upper surface of the mobile electronic device to bias the mobile electronic device toward and into the device pocket.

18. The seat assembly according to claim 11, wherein the vehicle seat includes a seat back and a head rest, the lower covering portion includes a seat back trim panel that is disposed at a rear surface of the seat back and that defines a device pocket for covering the lowermost portion of the mobile electronic device, and the upper support portion includes a head rest trim panel that is disposed at a rear surface of the head rest, the head rest trim panel defining a plurality of pairs of slits that engage upper corners of the mobile electronic device, each of the pairs of slits being vertically spaced from other pairs of slits to enable engagement with mobile electronic devices of different sizes.

19. The seat assembly according to claim 11, wherein the vehicle seat includes a seat back and a head rest, the lower covering portion is constituted by a cavity defined in an upper surface of the seat back, and the upper support portion is constituted by a rear surface of the head rest against which an upper portion of the mobile electronic device rests.

20. A method of manufacturing a holder assembly for use with a vehicle seat in a vehicle, the holder assembly being configured for holding a mobile electronic device in an orientation to enable a passenger in a rear compartment of the vehicle to view a screen of the mobile electronic device, the method comprising:

integrating a lower covering portion with a rear of the vehicle seat;

configuring the lower covering portion to cover and thereby retain a lowermost portion of the mobile electronic device;

integrating an upper support portion with the rear of the vehicle seat;

configuring the upper support portion to support a top portion of the mobile electronic device; and configuring the upper support portion and lower covering portion to cooperatively: 1) hold the mobile electronic device in the orientation to enable the passenger in the rear compartment of the vehicle to view the screen of the mobile electronic device upon the mobile electronic device being manually engaged with the holder assembly, and 2) enable the manual disengagement of the mobile electronic device from the holder assembly.

* * * * *